US007961384B2

(12) United States Patent
Pirsch

(10) Patent No.: US 7,961,384 B2
(45) Date of Patent: Jun. 14, 2011

(54) DEVICE AND METHOD FOR EXAMINING CHEMICAL AND/OR BIOLOGICAL SAMPLES, AND OBJECTIVE CAP

(75) Inventor: Matthias Pirsch, Hamburg (DE)

(73) Assignee: Evotec Technologies GmbH (DE)

( * ) Notice: Subject to any disclaimer, the term of this patent is extended or adjusted under 35 U.S.C. 154(b) by 1105 days.

(21) Appl. No.: 10/565,350

(22) PCT Filed: Jul. 16, 2004

(86) PCT No.: PCT/EP2004/007971
§ 371 (c)(1), (2), (4) Date: Apr. 3, 2007

(87) PCT Pub. No.: WO2005/010591
PCT Pub. Date: Feb. 3, 2005

(65) Prior Publication Data

US 2007/0291360 A1 Dec. 20, 2007

(30) Foreign Application Priority Data

Jul. 23, 2003 (DE) ................................ 103 33 326

(51) Int. Cl.
*G02B 21/00* (2006.01)

(52) U.S. Cl. ....................................... 359/368; 359/665

(58) Field of Classification Search ........................ None
See application file for complete search history.

(56) References Cited

U.S. PATENT DOCUMENTS 3,202,049 A 8/1965 Bond
3,837,731 A 9/1974 Amos et al.
6,809,794 B1 * 10/2004 Sewell ............................ 355/30

FOREIGN PATENT DOCUMENTS

DE 101 23 027 11/2002
WO WO 99/49504 9/1999
WO WO 02093232 A2 * 11/2002

* cited by examiner

*Primary Examiner* — Stephone B Allen
*Assistant Examiner* — Derek S Chapel
(74) *Attorney, Agent, or Firm* — Ohlandt, Greeley, Ruggiero & Perle, LLP

(57) ABSTRACT

A device for examining chemical and/or biological samples is provided that includes a sample carrier. The sample carrier includes a sample carrier wall through which a sample is examined with the aid of an objective. The objective includes an exit lens that defines a gap towards an outer surface of the sample carrier wall, in which gap a film of an immersion material can be arranged such that the film is in contact with both the outer surface and the exit lens. The exit lens is surrounded by an objective cap. To improve protection of the objective from becoming fouled by the immersion medium, the objective cap includes a capillary channel connected with a suction device for discharging the immersion medium.

14 Claims, 4 Drawing Sheets

DEVICE AND METHOD FOR EXAMINING CHEMICAL AND/OR BIOLOGICAL SAMPLES, AND OBJECTIVE CAP

FIELD OF THE INVENTION

The invention relates to a device and a method for examining chemical and/or biological samples with the aid of optical means, and an objective cap for the optical means used for this purpose. The optical means may, for example, be a microscope, in particular an inverse confocal microscope.

DISCUSSION OF THE BACKGROUND ART

Such examination devices comprise an objective for observing the sample. If, with the aid of the objective, for example a sample in the sample carrier is viewed from below through a sample carrier bottom transparent to observation radiation, the given constellation of the refraction indices has an adverse effect on the course of the radiation path, in particular in high numeric objectives. Different refraction indices occur at the transitions between the exit lens of the objective and the ambient air as well as between the bottom of the sample carrier and the medium arranged between the objective and the sample carrier bottom.

In particular confocal microscopes used for high-throughput screening require a very small focus. This is necessary since in high-throughput screening samples with small volumes in the µl-range are examined. Since the amount of radiation emitted by the sample and detected by the objective (collection efficiency) has a large influence on the measuring time, the aperture of the objective must be as high as possible. This is of importance in particular in high-throughput screening since the measuring time is one of the crucial parameters.

Usually, an immersion liquid with a refraction index of >1 is applied to the exit lens of the objective. Such an examination device, where the immersion liquid is automatically supplied, is known from WO 02/093232. The objective of the device is arranged at such a small distance to a sample carrier that the immersion liquid applied to the objective is held by capillary forces in a gap defined between the objective and an outer surface of a sample carrier wall. Alternatively, the immersion liquid may be supplied by vertically and/or horizontally moving the objective for the purpose of applying, for example with a pipette, an immersion medium, such as distilled water, to the objective without abutting on the sample carrier. The objective of the described device is surrounded by a collection means for receiving excess immersion medium. This arrangement is intended to prevent the objective from becoming fouled by particles adhering to the glass bottom.

It is a drawback of such an examination device that the collection means can only be of a very small size due to shortage of space. This leads to difficulties with regard to discharge of the immersion medium in the collection means. The excess immersion medium normally forms individual drops in the collection means, said drops being difficult to draw off the collection means by suction via a single suction opening. Over time, the drops become increasingly larger such that there is the risk of a drop becoming that large that the immersion medium flows over the edge of the collection means. In particular when the sample carrier is subjected to high acceleration forces, as in the case of measuring time reduction in high-throughput screening, there is the risk of individual drops of the immersion medium adhering to the cover slip and falling down later.

It is an object of the invention to provide a device and a method for examining chemical and/or biological samples, and an objective cap which allows immersion liquid to be reliably and automatically supplied and discharged.

SUMMARY OF THE INVENTION

The device for examining chemical and/or biological samples according to the invention comprises a sample carrier for receiving the samples to be examined. An objective is arranged opposite the sample carrier, the objective forming in particular a part of an inverse microscope. For observing the samples, the sample carrier comprises a sample carrier wall transparent to the corresponding wavelength. An exit lens of the objective is arranged opposite an outer surface of the sample carrier wall such that the sample can be examined through the sample carrier wall. Between the exit lens of the objective and the outer surface of the sample carrier wall a gap is defined which corresponds to the subject focal distance of the objective. The gap has a width which allows a film of an immersion medium to be arranged therein such that the film is in contact with both the outer surface of the sample carrier wall and the exit lens or the exit window of the objective. For this purpose, the gap preferably has a distance of less than 1000 µm, in particular less than 500 µm, and most preferably less than 200 µm.

The exit lens or the exit window is surrounded by a protection means pre-venting the objective from becoming fouled by the immersion medium. The protection means is connected with a suction means for discharging the immersion medium. According to the invention, the protection means comprises a capillary channel connected with the suction means for discharging the immersion medium, i.e. the immersion medium is discharged, at least partly with the aid of capillary forces, via the capillary channel.

Due to the capillary forces prevailing in the capillary channel, part of the immersion medium, which is for example present as drops, is drawn by suction into the capillary channel. Thereby a drop of the immersion medium is quasi punctured or lanced such that the immersion medium drop leaks into the capillary channel. The risk of a drop becoming increasingly larger and passing the protection means thus fouling the objective is thus eliminated. Thus reliable supply and discharge of immersion medium is ensured.

The protection device may, for example, comprise a plurality of capillary channels having inlet openings annularly arranged around the exit lens. The inlet openings have a cross-sectional area of preferably <1 $mm^2$, in particular <0.8 $mm^2$. To facilitate manufacture, the capillary channel is alternatively configured essentially as an annular gap around the exit lens, i.e. the individual inlet openings are quasi combined into a single gap. The gap width of the annular gap is in particular smaller than 500 µm.

In a preferred embodiment, the protection means comprises at least two collar portions arranged around the objective and defining the capillary channel. This means that the collar portions comprise a region in which they are spaced relative to each other such that the capillary channel is defined. Thereby the manufacture of the capillary channel can be facilitated. Further, the installation of the protection means can be facilitated since it is possible to arrange the collar portions in the form of onion-like layers or layer-wise one upon the other. When a plurality of collar portions are arranged one upon the other, it is particularly easy to define a plurality of capillary channels. For example, one capillary channel is used for discharging and one capillary channel is used for supplying immersion medium. Supply and discharge are thus carried out in separate capillary rings.

The protection means preferably comprises an overflow reservoir for additionally receiving the immersion medium. This prevents the objective from becoming fouled by immersion medium in case the objective is removed from the sample carrier after examination of a sample carrier and thus suddenly a larger part of the film of immersion medium arranged in the gap between the exit lens and the sample carrier wall flows off. In particular, to make an additional suction means superfluous, the capillary channel is connected with the overflow reservoir. This is accomplished in particular in that the overflow reservoir comprises a reservoir bottom having a reservoir bottom opening which, in a preferred embodiment, corresponds to the capillary channel configured as an annular gap. Thus the capillary channel is connected via this reservoir bottom opening with the overflow reservoir. In this embodiment, the immersion medium to be discharged flows, for example as a single drop, first into the overflow reservoir and is discharged from there with the aid of the capillary forces prevailing in the capillary channel.

In a particularly preferred embodiment, the device for examining chemical and/or biological samples further comprises a supply means having a supply line, wherein an outlet opening of the supply line is arranged that near the exit lens of the objective that supply of immersion medium into the gap is effected at least partly with the aid of capillary forces. The supply line is in particular configured as described in WO 02/093232. This measure helps to automatically supply immersion medium into the gap. In cooperation with the capillary channel automatic discharge of the immersion medium is effected at the same time such that a continuous exchange of immersion medium, for example for preparation and/or cleaning purposes, can be ensured. Further, time-consuming supply of immersion medium by pipetting becomes superfluous.

Alternatively to supply via the supply line, the immersion medium may be supplied via the capillary channel. In this embodiment, the capillary channel is not connected with the overflow reservoir but comprises a capillary channel opening which is arranged that near the exit lens that supply of immersion medium into the gap is effected at least partly with the aid of capillary forces. Further, the capillary channel is connected with a valve, in particular a 3/2-way valve, via which the capillary channel is connected with both the suction means and the supply means. In contrast to the embodiment with the supply line, here the immersion medium is not exchanged continuously but discontinuously. This means that in one work step immersion medium is supplied and, when the valve has been switched, immersion medium is discharged in another work step, or vice versa.

Further, the invention relates to a method for examining chemical and/or biological samples, in particular with the aid of a device described above. In the method according to the invention, an exit lens of an objective is arranged opposite a sample carrier for allowing the sample to be observed through a sample carrier wall. Between an outer surface of the sample carrier wall and the exit lens of the objective a gap is defined such that in the gap a film of an immersion medium is arranged, e.g. with the aid of capillary forces. The film is in contact with both the outer surface of the sample carrier wall and the exit lens of the objective. According to the invention, the immersion medium is automatically discharged via a capillary channel defined in a protection means surrounding the objective, the discharge being supported at least by capillary forces. To improve discharge of the immersion medium, a low vacuum is produced, in particular in the capillary channel, with the aid of a suction means.

In a preferred embodiment, the immersion medium is supplied automatically, at least partly with the aid of capillary forces. It is particularly advantageous to discharge the immersion medium such that the volume of the film of immersion medium remains essentially constant. The discharged volume flow is essentially adjusted in accordance with the supplied volume flow. The discharged amount of immersion medium can be adjusted by constructional measures, for example by correspondingly dimensioning the capillary channel. Further, the discharged amount of the immersion medium can be adjusted by varying a prevailing negative pressure. This is in particular effected automatically with the aid of a corresponding control means which detects in particular the size of the film of immersion medium in the gap between the exit lens and the sample carrier wall.

Further, the invention relates to an objective cap for preventing an objective, which in particular forms a part of the device according to the invention, from becoming fouled by an immersion medium. For this purpose, the objective cap comprises an inner collar portion to be placed onto the objective. Further, the objective cap comprises an outer collar portion arranged around the inner collar portion. The inner collar portion and the outer collar portion are at least partly spaced relative to each other such that an essentially annular capillary channel is defined. The outer collar portion comprises an outlet opening via which the capillary channel is connected with a suction device. Further, the outer collar portion comprises an overflow reservoir for receiving the immersion medium, wherein the overflow reservoir comprises a reservoir bottom having a reservoir bottom opening via which the capillary channel is connected with the overflow reservoir for discharging immersion medium. The objective cap according to the invention essentially offers the same advantages as the device according to the invention. The objective cap is in particular configured such that it corresponds to the protection means of the device according to the invention. Further, the objective cap is suitable for carrying out the method according to the invention.

BRIEF DESCRIPTION OF THE DRAWINGS

Embodiments of the invention will now be described in greater detail with reference to the accompanying drawings in which.

DETAILED DESCRIPTION OF THE PREFERRED EMBODIMENT

Figure 1:
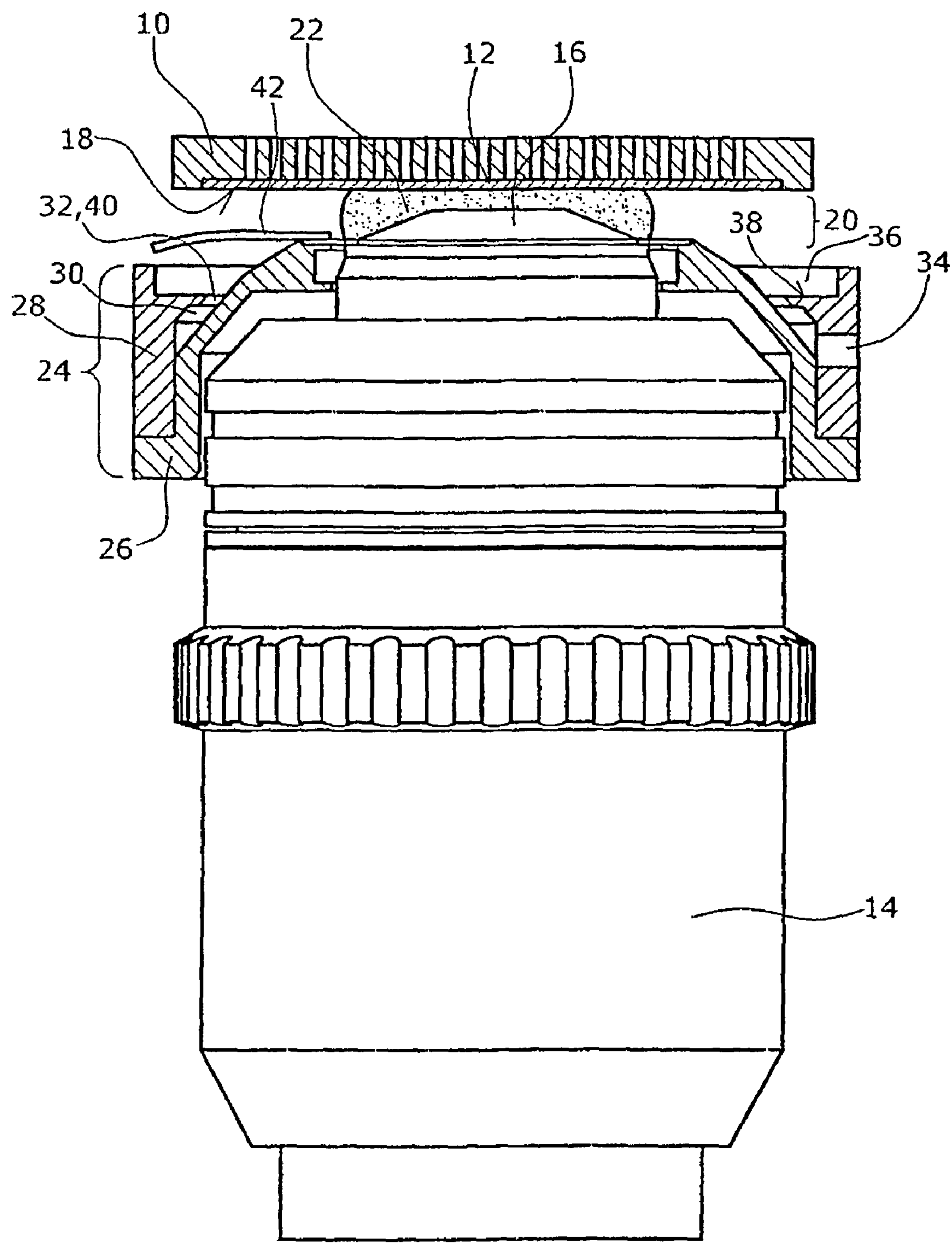
FIG. 1 shows a schematic side view of a first embodiment of the device according to the invention.

The device for examining chemical and/or biological samples according to the invention shown in FIG. 1 comprises a sample carrier 10 for receiving the samples. The sample carrier 10 comprises a sample carrier wall 12 through which an objective 14 of a confocal microscope (not shown) can examine the samples from below. Between an exit lens 16 and an outer surface 18 of the sample carrier wall 12 a gap 20 is defined in which a film 22 of an immersion medium is provided with the aid of capillary forces. The film 22 is in contact with both the outer surface 18 and the exit lens 16.

The exit lens 16 is surrounded by a protection means 24 which prevents the objective 14 from becoming fouled by the immersion medium. In the illustrated embodiment, the protection means 24 is configured as an objective cap. This means that the objective cap 24 is adapted to be placed onto the objective 14. The protection means 24 comprises an inner collar portion 26 and an outer collar portion 28. The inner and outer collar portions 26,28 comprise a region in which they are spaced relative to each other such that a capillary channel 30 is defined. The capillary channel comprises a capillary channel opening 32 via which the immersion medium to be discharged can be drawn by suction into the capillary channel 30. The capillary channel 30 is connected via an outlet opening 34 provided in the outer collar portion 28 with a suction means.

The outer collar portion 28 further comprises an overflow reservoir 36 adapted to additionally receive immersion medium. The overflow reservoir 36 comprises a reservoir bottom 38 having a reservoir bottom opening 40. In the illustrated embodiment, the reservoir bottom opening 40 is identical with the capillary channel opening 32.

The device for examining chemical and/or biological samples according to the invention further comprises a supply line 42 via which immersion medium is supplied, with the aid of capillary forces, into the gap 20 between the exit lens 16 and the sample carrier wall 12. For this purpose, the supply line 42 is connected with a supply means which returns immersion medium which has previously been discharged, for example via the capillary channel 30, and subsequently cleaned and conditioned, if necessary.

Figure 2:
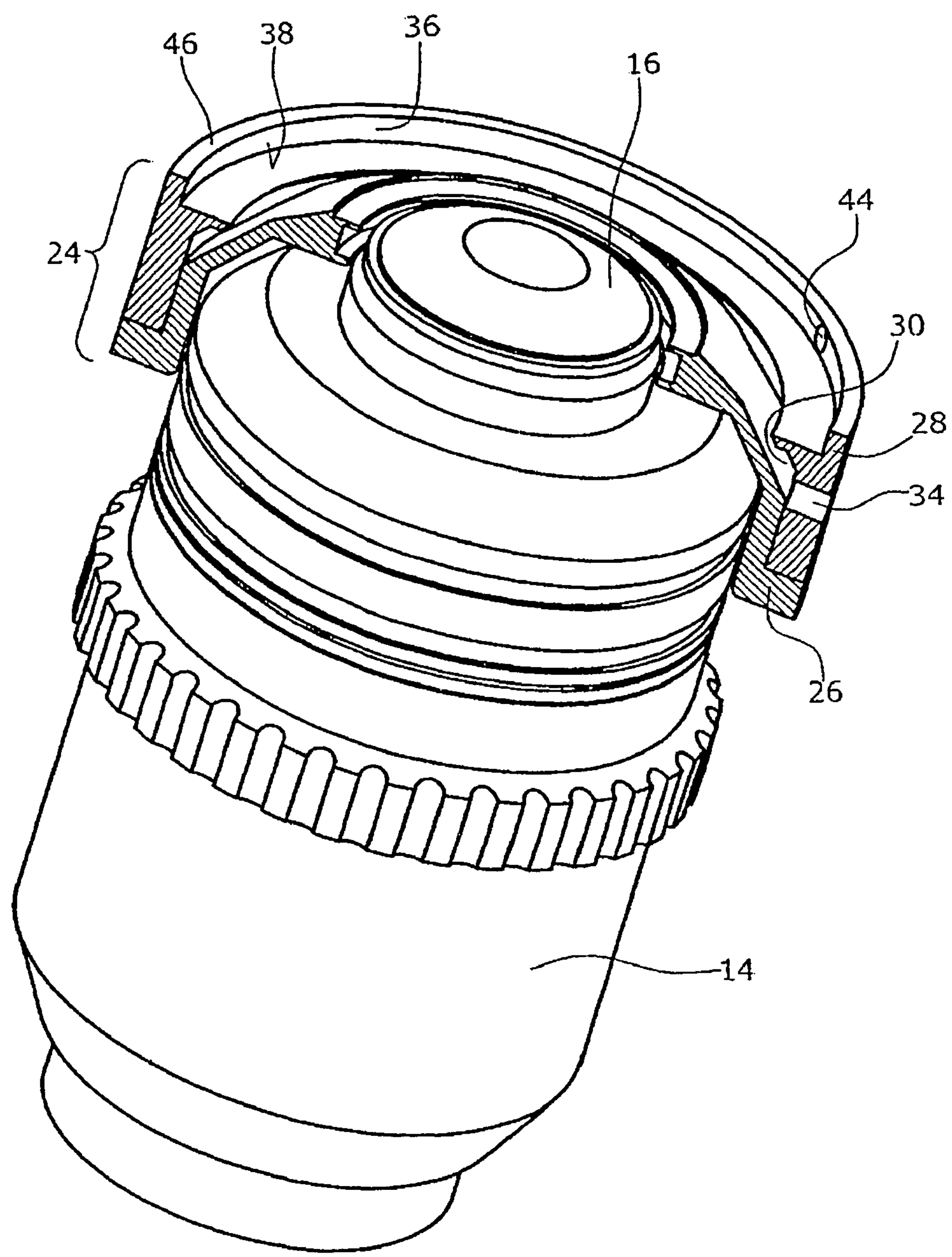
FIG. 2 shows a perspective schematic view of the device of FIG. 1.

As can be seen in FIG. 2, the overflow reservoir 36 additionally comprises an opening 44 via which the supply line 42 can be fastened. The supply line 42 is thus fixed in its position relative to the objective 14. Any resilient movement of the objective 14 does thus not cause the supply line 42 to move out of its proper position.

Figure 3:
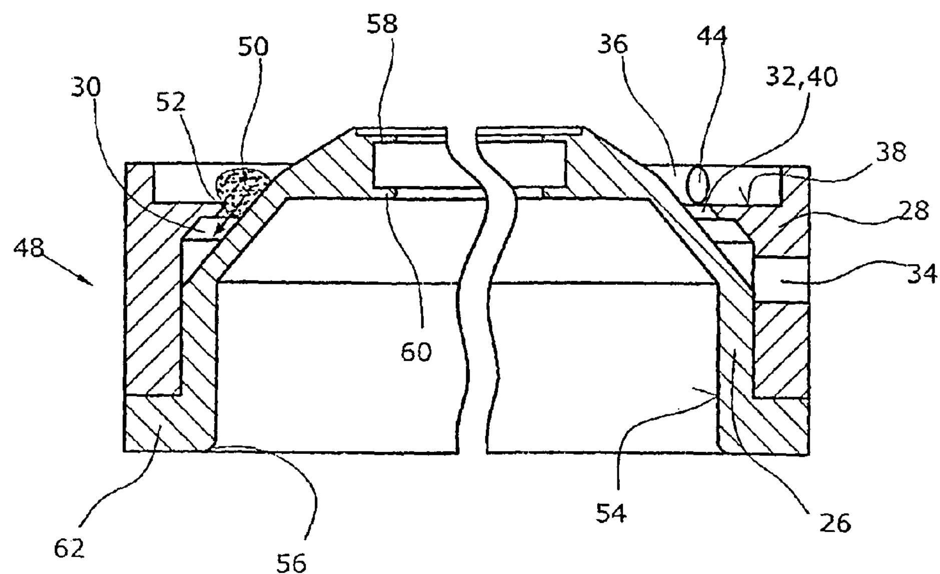
FIG. 3 shows a schematic sectional view of an objective cap according to the invention.

FIG. 3 shows an objective cap 48 according to the invention, which is configured such that it corresponds to the protection means 24 of FIG. 1 and FIG. 2. Elements of the objective cap 48 acting identically bear the same reference numerals. In the overflow reservoir 36 a drop 50 of immersion medium is shown which is positioned above the reservoir bottom opening 40 and/or the capillary channel opening 32. Due to capillary forces prevailing in the capillary channel 30 part 52 of the drop 50 is drawn by suction into the capillary channel 30. The part 52 is "forced open" by the capillary forces such that the drop 50 leaks into the capillary channel 30.

The inner collar portion 26 of the objective cap 48 has a contour 54 which allows the cap to be placed as easily as possible onto an objective 14. Further, the inner collar portion 26 comprises two extensions 58,60 into which a sealing ring can be inserted. The latter serves as a seal between the objective 14 and the inner collar portion 26.

The inner collar portion 26 further comprises a shoulder 62 which, acting as a stop, holds the outer collar portion 28. With the aid of the shoulder 62 a precisely defined capillary channel 30 can be adjusted, which can be further adjusted by adding or removing annular spacer elements (not shown).

Figure 4:
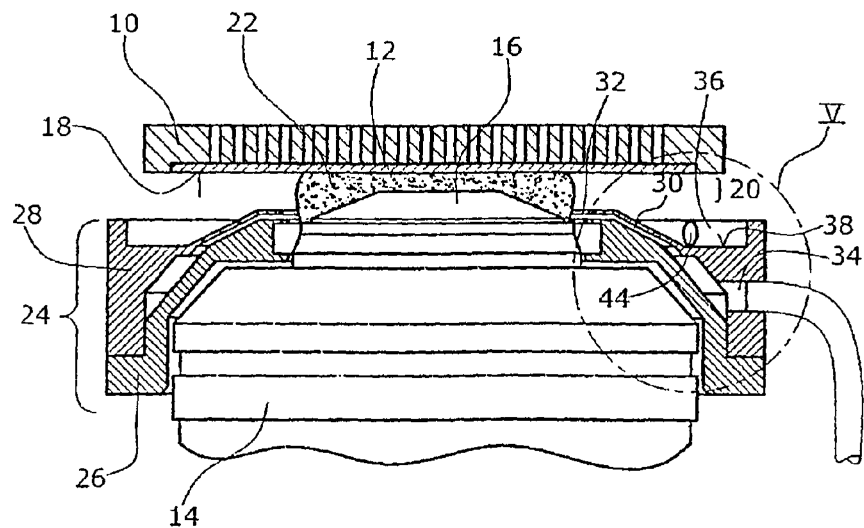
FIG. 4 shows a schematic sectional view of another embodiment of the device according to the invention.

In the second embodiment of the device for examining chemical and/or biological samples according to the invention shown in FIG. 4, elements acting identically bear the same reference numerals. In this embodiment, the outer collar portion 28 does not comprise any direct connection between the overflow reservoir 36 and the capillary channel 30. The capillary channel opening 32 is thus not located near the overflow reservoir 36 but near the film 22 of immersion medium. Similar to the supply line 42 of the first embodiment of the device according to the invention, the capillary channel opening 32 is arranged that near the exit lens 16 that immersion medium is supplied into the gap 20 at least partly with the aid of capillary forces. This means that the capillary channel 30 is used for both discharge and supply of immersion medium. For this purpose, the capillary channel 30 is connected via the outlet opening 34 with a 3/2-way valve which, in turn, is connected with the suction means and the supply means. In this embodiment, a supply line 42 is not required.

Figure 5:
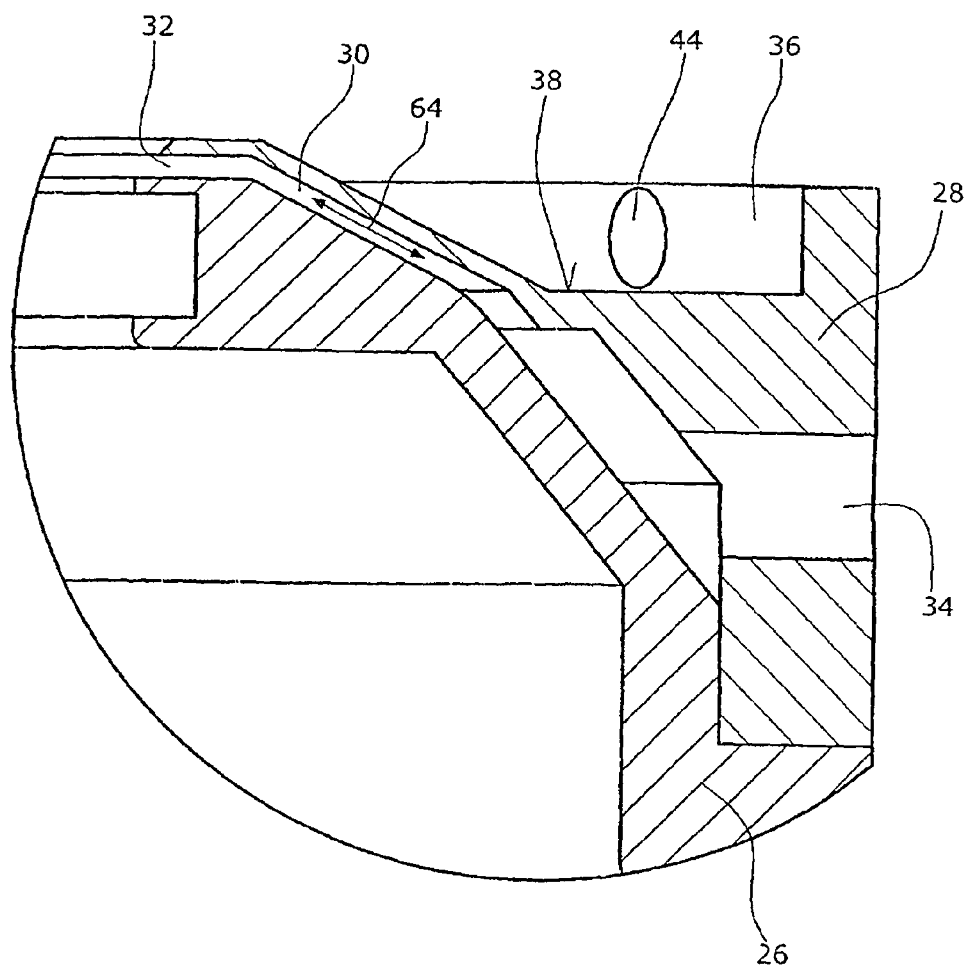
FIG. 5 shows an enlarged portion of the protection means of FIG. 4.

Thus medium flows through the capillary channel 30 in two directions, as indicated by arrow 64 in FIG. 5. Thus the capillary channel 30 serves for both discharge of immersion medium with the aid of capillary forces and supply of immersion medium with the aid of capillary forces.

What is claimed is:

1. A device for examining chemical or biological samples, comprising:

a sample carrier for receiving the samples, an objective for observing the samples through a sample carrier wall, wherein a gap is defined between an outer surface of the sample carrier wall and an exit lens of the objective, a film of an immersion medium to be provided in the gap such that the film is in contact with both the outer surface of the sample carrier wall and the exit lens of the objective, and a protection means surrounding the exit lens for preventing the objective from becoming fouled by the immersion medium, wherein the protection means is connected with a suction means for discharging the immersion medium, wherein the protection means comprises a plurality of capillary channels which are connected with the suction means for discharging the immersion medium, and which aid the discharge of the immersion medium with at least the aid of capillary forces, the plurality of capillary channels each having an inlet opening that is arranged annularly around the exit lens.

2. The device according to claim 1, wherein the protection means comprises at least two collar portions arranged around the objective and defining the capillary channel.

3. The device according to one of claim 1, wherein the protection means comprises an overflow reservoir for additionally receiving the immersion medium.

4. The device according to claim 3, wherein the overflow reservoir comprises a reservoir bottom having a reservoir bottom opening via which the capillary channel is connected with the overflow reservoir.

5. The device according to claim 1, further comprising a supply means having a supply line with an outlet opening, wherein the outlet opening is arranged near the exit lens of the objective so that the immersion medium is supplied into the gap at least partly with the aid of capillary forces.

6. The device according to claim 1, wherein the capillary channel is connected with a supply means for supplying the immersion medium, and the capillary channel comprises a capillary channel opening that is arranged near the exit lens so that the immersion medium is supplied into the gap at least partly with the aid of capillary forces.

7. The device according to claim 6, wherein the capillary channel is connected with a valve, wherein the valve is connected with the suction means and with the supply means.

8. A device for examining chemical or biological samples, comprising:

a sample carrier for receiving the samples, an objective for observing the samples through a sample carrier wall, wherein a gap is defined between an outer surface of the sample carrier wall and an exit lens of the objective, a film of an immersion medium to be provided in the gap such that the film is in contact with both the outer surface of the sample carrier wall and the exit lens of the objective, and a protection means surrounding the exit lens for preventing the objective from becoming fouled by the immersion medium, wherein the protection means is connected with a suction means for discharging the immersion medium, wherein the protection means comprises a capillary channel which is connected with the suction means for discharging the immersion medium, and which aids the discharge of the immersion medium with at least the aid of capillary forces, and wherein the capillary channel is essentially configured as an annular gap around the exit lens.

9. A method for examining chemical or biological samples, wherein an exit lens of an objective is arranged opposite a sample carrier for observing the sample through a sample carrier wall, wherein between an outer surface of the sample carrier wall and the exit lens of the objective a gap is defined such that in the gap a film of an immersion medium is arranged that is in contact with both the outer surface of the sample carrier wall and the exit lens of the objective, wherein via a capillary channel defined in a protection means surrounding the objective as an annular gap around the exit lens the immersion medium is discharged automatically, at least with the aid of capillary forces.

10. The method according to claim 9, wherein the immersion medium is supplied automatically, at least partly with the aid of capillary forces.

11. The method according to claim 10, wherein the discharge of the immersion medium is adjusted relative to the supply such that the volume of the film of immersion medium essentially remains constant.

12. An objective cap for protecting an objective from becoming fouled by an immersion medium, comprising:

an inner collar portion adapted to be placed onto the objective, an outer collar portion arranged around the inner collar portion, wherein the inner collar portion and the outer collar portion are at least partly spaced relative to each other such that an essentially annular capillary channel is defined, the capillary channel aiding in removing the immersion medium with at least the aid of capillary forces, and an outlet opening provided in the outer collar portion, via which an opening of the capillary channel is connected with a suction means.

13. The objective cap according to claim 12, wherein an overflow reservoir arranged in the outer collar portion for receiving the immersion medium, wherein the overflow reservoir comprises a reservoir bottom having a reservoir bottom opening via which the capillary channel is connected with the overflow reservoir for discharging immersion medium.

14. The objective cap according to claim 12, wherein the inner collar portion and the outer collar portion are at least partly spaced relative to each other such that a plurality of capillary channels are defined, the plurality of capillary channels each having an inlet opening that is arranged annularly around the exit lens.

* * * * *